US012726346B2

(12) United States Patent
Campiglio et al.

(10) Patent No.: US 12,726,346 B2
(45) Date of Patent: Sep. 1, 2026

(54) DETERMINISTIC ADDRESS ROTATION

(71) Applicant: Cisco Technology, Inc., San Jose, CA (US)

(72) Inventors: Ugo Mario Campiglio, Morges (CH); Jerome Henry, Pittsboro, NC (US); Stephen Michael Orr, Wallkill, NY (US)

(73) Assignee: CISCO TECHNOLOGY, INC., San Jose, CA (US)

(*) Notice: Subject to any disclaimer, the term of this patent is extended or adjusted under 35 U.S.C. 154(b) by 605 days.

(21) Appl. No.: 17/984,617

(22) Filed: Nov. 10, 2022

(65) Prior Publication Data

US 2024/0163089 A1 May 16, 2024

(51) Int. Cl.
*H04W 12/02* (2009.01)
*H04L 9/08* (2006.01)
(Continued)

(52) U.S. Cl.
CPC .......... *H04L 9/0866* (2013.01); *H04L 9/0838* (2013.01); *H04L 9/3242* (2013.01); *H04L 63/0876* (2013.01); *H04W 12/02* (2013.01)

(58) Field of Classification Search
CPC ... H04L 9/0866; H04L 63/0876; H04W 12/02
See application file for complete search history.

(56) References Cited

U.S. PATENT DOCUMENTS 11,128,661 B2 9/2021 Li et al.
11,700,527 B2 7/2023 Gundavelli et al.
(Continued)

FOREIGN PATENT DOCUMENTS

GB 2616033 A * 8/2023 ............ H04W 12/02
WO 2017026930 A1 2/2017
WO WO-2023161134 A1 * 8/2023 ............ H04W 12/02

OTHER PUBLICATIONS

Baron et al. Enhanced Randomized and Changing MAC address(ERCM) IEEE 802.11-22/0114r3 May 2022 (Year: 2022).*
(Continued)

*Primary Examiner* — David J Pearson
(74) *Attorney, Agent, or Firm* — Edell, Shapiro & Finnan, LLC

(57) ABSTRACT

Methods that support deterministic random media access control (MAC) address rotation that allows sharing of an address identity with a trusted wireless network infrastructure by generating a next address based on a previously used address and a seed obtained from a previous association with the trusted network infrastructure. In these methods, a computing device obtains a request for a secure connection of an endpoint device to a wireless network. The computing device performs an access authentication for the secure connection and establishes the secure connection of the endpoint device to the wireless network based on successfully performing the access authentication, in which cryptographic information for encrypting one or more network messages is generated. The computing device further generates a subsequent device address for a subsequent secure connection of the endpoint device to the wireless network, based on a current device address obtained from the request and the cryptographic information.

21 Claims, 5 Drawing Sheets

(51) Int. Cl.
*H04L 9/32* (2006.01)
*H04L 9/40* (2022.01)

(56) References Cited

U.S. PATENT DOCUMENTS

| | | | | |
|---|---|---|---|---|
| 2005/0033960 | A1 | 2/2005 | Vialen et al. | |
| 2007/0118748 | A1* | 5/2007 | Edney | H04W 8/26 713/171 |
| 2007/0280207 | A1* | 12/2007 | Shimizu | H04L 61/25 370/353 |
| 2009/0074187 | A1* | 3/2009 | Inoue | H04L 63/1458 380/270 |
| 2015/0040195 | A1 | 2/2015 | Park et al. | |
| 2016/0135053 | A1 | 5/2016 | Lee et al. | |
| 2016/0295409 | A1 | 10/2016 | Lee et al. | |
| 2019/0246268 | A1 | 8/2019 | Walker et al. | |
| 2020/0007496 | A1* | 1/2020 | Park | H04L 63/0407 |
| 2020/0351648 | A1 | 11/2020 | Fang | |
| 2021/0014679 | A1* | 1/2021 | Liu | H04W 12/50 |
| 2021/0058376 | A1* | 2/2021 | Teissonniere | H04L 9/0643 |
| 2021/0360465 | A1 | 11/2021 | Henry et al. | |
| 2021/0367872 | A1 | 11/2021 | Huang et al. | |
| 2022/0053021 | A1 | 2/2022 | Li et al. | |
| 2022/0086627 | A1 | 3/2022 | Montemurro et al. | |
| 2022/0264300 | A1 | 8/2022 | Nix | |
| 2022/0377042 | A1 | 11/2022 | Henry et al. | |
| 2023/0354034 | A1* | 11/2023 | Ficara | H04W 12/73 |
| 2024/0276218 | A1* | 8/2024 | Yang | H04W 12/06 |
| 2025/0119852 | A1* | 4/2025 | Liu | H04L 61/50 |

OTHER PUBLICATIONS

Nizzi et al. IoT Security via Address Shuffling: The Easy Way IEEE Internet of Things Journal, vol. 6, No. Apr. 2, 2019 (Year: 2019).*

Henry, J., et al., "Randomized and Changing MAC Address Use Cases, draft-henry-madinas-framework-02" Internet Engineering Task Force, Internet-Draft, Intended status: Informational, https://www.ietf.org/archive/id/draft-henry-madinas-framework-02.txt, May 3, 2021, 13 pages.

Aura, T., Microsoft Research, RFC 3972: Cryptographically Generated Addresses (CGA), Network Working Group, Request for Comments: 3972, Category: Standards Track, https://www.rfc-editor.org/rfc/rfc3972, Mar. 2005, 22 pages.

Orr, S., Cisco, "Advancements in Wireless Security," Its about time, BRKEWN-2006, Jan. 27-31, 2020, retrieved Jul. 7, 2022, 119 pages.

Noh, J., et al., "Secure Authentication and Four-Way Handshake Scheme for Protected Individual Communication in Public Wi-Fi Networks," IEEE Access, vol. 6, published Mar. 12, 2018, 10 pages.

"eTutorials.org, "Key Management," retrieved from http://etutorials.org/Networking/Wireless+lan+security/Chapter+8.+WLAN+Encryption+and+Data+Integrity+Protocols/Key+Management/#ch08lev3sec15, Jul. 19, 2022, 6 pages."

IEEE SA Standards Association, IEEE Standard for Information Technology—Telecommunications and Information Exchange between Systems Local and Metropolitan Area Networks—Specific Requirements, "Part 11: Wireless LAN Medium Access Control (MAC) and Physical Layer (PHY) Specifications," Dec. 3, 2020, pp. Jan. 2000 (Part 1).

IEEE SA Standards Association, IEEE Standard for Information Technology—Telecommunications and Information Exchange between Systems Local and Metropolitan Area Networks—Specific Requirements, "Part 11: Wireless LAN Medium Access Control (MAC) and Physical Layer (PHY) Specifications," Dec. 3, 2020, pp. 2001-4379 (Part 2).

* cited by examiner

DETERMINISTIC ADDRESS ROTATION

TECHNICAL FIELD

The present disclosure generally relates to data and communication networks.

BACKGROUND

A device address used by a mobile device on a wireless network may also be used as personal identifiable information (PII). By sniffing wireless network traffic, an eavesdropper may determine an identity of the user of the mobile device. If the user is identified, the eavesdropper may then easily track the user's position, activity, etc. To improve privacy of a mobile device user, many mobile operating systems are changing (or "rotating") a device address used to identify a mobile device on a wireless network. Initially, the device address is only changed when scanning for wireless connectivity prior to establishing a connection with a wireless network, then at each new association. However, device addresses may be changed at random intervals, even when connected to a wireless network, e.g., using techniques known as randomized and changing Media Access Control address (RCM). While rotation of a wireless device's address can improve privacy, the wireless network infrastructure may not be designed to accommodate such address rotation, and in many cases, uses the device address as an identifier of the wireless device for a variety of operations.

DETAILED DESCRIPTION

Overview

Techniques are presented herein that support deterministic random MAC address rotation (RCM), and in so doing, allow sharing of the MAC address identity with a trusted wireless network infrastructure. That is, the techniques generate a next MAC address based on a previously used MAC address and a seed obtained from a previous association with the trusted wireless network infrastructure.

In one form, a computing device obtains a request for a secure connection of an endpoint device to a wireless network. The computing device performs an access authentication for the secure connection of the endpoint device to the wireless network and establishes the secure connection of the endpoint device to the wireless network based on successfully performing the access authentication, in which cryptographic information for encrypting one or more network messages is generated. The computing device further generates a subsequent device address for a subsequent secure connection of the endpoint device to the wireless network, the subsequent device address being generated based on a current device address obtained from the request and the cryptographic information.

EXAMPLE EMBODIMENTS

Random device address rotations are a challenge to technologies and/or networks that rely on the device address as a unique identifier (such as the PII and/or source node recognition). For example, a device address (e.g., MAC address) is used for MAC Authentication Bypass (MAB), MAC-based Access Control List (ACL) to access network (s), network resources, telemetry, time-machine, etc.

The techniques presented herein provide for random address rotations that can satisfy the privacy concern against out-of-network listeners but allow a trusted network, etc., to know the identity of the endpoint device to allow access to services that require device address knowledge. Specifically, the techniques generate a device address based on available information without using any key or other information generated specifically for device address rotation. The techniques use the current device address and a seed obtained from generated cryptographic information to generate the next or new device address. No new information needs to be generated or exchanged for predictive generation of MAC addresses by an endpoint device and a network entity (such as an access point (AP) and/or wireless local access network (LAN) controller (WLC)). The seed is derived using one or more elements of the previous association/connection.

The techniques presented herein allow endpoint devices to use different MAC addresses at each connection, preserving privacy against eavesdroppers on a network that they do not intend to connect to, but at the same time allowing the endpoint devices to share their device address identity with one or more network(s) that they intend to connect to and therefore trust.

Figure 1:
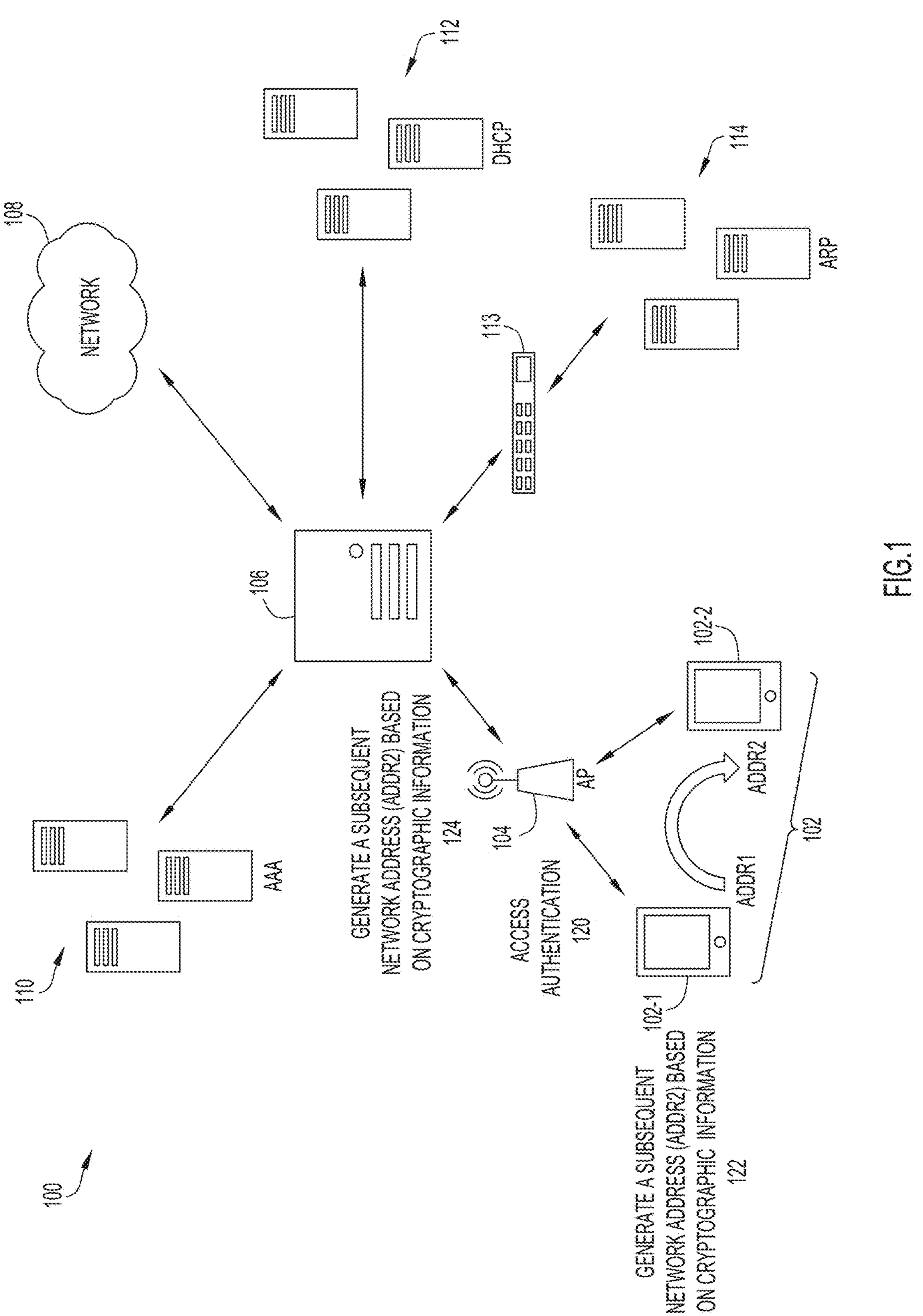
FIG. 1 is a block diagram illustrating a network environment in which deterministic device address rotation is performed, according to an example embodiment.

FIG. 1 is a block diagram illustrating a network environment 100 in which deterministic device address rotation is performed, according to an example embodiment. The network environment 100 includes a wireless client device 102, an access point (AP) 104, a wireless local access network (LAN) controller (WLC) 106, a network 108, an authentication, authorization, and accounting (AAA) server 110, a dynamic host control protocol (DHCP) server 112, a router 113, and an address resolution protocol (ARP) server 114.

This is only an example of the network environment 100, and the number and types of entities may vary based on a particular deployment and use case scenario, such as the type of service being provided and network structures. For example, while the network environment 100 includes the AP 104, other network devices may be present in the network environment 100. The network devices may include, but are not limited to, switches, virtual routers, leaf nodes, spine nodes, etc.

In various example embodiments, the entities of the network environment 100 (the wireless client device 102, the AP 104, the WLC 106, the AAA server 110, the DHCP server 112, the router 113, and the ARP server 114) may each include a network interface, at least one processor, and a memory. Each entity may be an apparatus or any programmable electronic or computing device capable of executing computer readable program instructions. The network interface may include one or more network interface cards (having one or more ports) that enable components of the entity to send and receive packets or data over the network(s), such as a local area network (LAN) or a wide area network (WAN), and/or wireless access networks such as the network 108. Each entity may include internal and external hardware components such as those depicted and described in further detail in FIG. 5. In one example, at least some of these entities may be embodied as virtual devices with functionality distributed over a number of hardware devices, such as virtual APs, switches, routers, servers, etc.

In the network environment 100, the wireless client device 102 is in communication with the AP 104. The wireless client device 102 is any suitable device configured to initiate a flow in the network environment 100, such as a data source device and/or data sink device. The wireless client device 102 is referred to as a mobile device, endpoint device, etc., interchangeably. The wireless client device 102 receives and/or sends one or more encrypted network messages.

For example, the wireless client device 102 may include a computer, an enterprise device, an appliance, an Internet of Things (IoT) device, a Personal Digital Assistant (PDA), a laptop or electronic notebook, a smartphone, a tablet, and/or any other device and/or combination of devices, components, elements, and/or objects capable of initiating voice, audio, video, media, or data exchanges within the network environment 100. The wireless client device 102 may also include any suitable interface to a human user such as a microphone, a display, a keyboard, or other terminal equipment. The wireless client device 102 may be configured with appropriate hardware (e.g., processor(s), memory element (s), antennas and/or antenna arrays, baseband processors (modems), and/or the like such as those depicted and described in further detail in FIG. 5), software, logic, and/or the like to facilitate respective Over-the-Air (OTA) interfaces for accessing/connecting to the AP 104 and sending or receiving packets.

The wireless client device 102 is shown rotating or otherwise modifying its device address that identifies the wireless client device 102 to the AP 104 and to other devices on the network 108. A first image 102-1 represents the wireless client device 102 when it is identified using a first device address (ADDR1). A second image 102-2 represents the wireless client device 102 when it is identified using a second device address (ADDR2).

The AP 104 and the WLC 106 may represent a wireless infrastructure that provides Wireless Local Area Network (WLAN) coverage for a specific geographic area/location. For example, wireless infrastructure may serve an airport, a shopping mall, a train station, a venue, etc. The wireless client device 102 and the AP 104 may use various wireless access network protocols, such as the Wi-Fi© wireless technology, to send and receive various network packets/messages. In one example, the AP 104 compares the source address in the one or more network messages with subsequent device addresses to identify or determine whether these network messages originated from the wireless client device 102. In one example, the wireless client device 102 may be configured to connect to (establish an association with) a WLAN (e.g., the network 108 through the AP 104).

The AP 104 may be a WLAN AP configured with appropriate hardware (e.g., processor(s), memory element(s), antennas and/or antenna arrays, baseband processors (modems), and/or the like), software, logic, and/or the like to provide coverage for a WLAN access network (e.g., Wi-Fi®). In various example embodiments, the AP 104 may be implemented as a Wi-Fi access point (AP) and/or the like. The AP 104 may be configured to facilitate respective OTA interfaces for accessing/connecting to the wireless client device 102 (to send and receive packets and/or network messages). The AP 104 may compare the source address in the network messages with stored device addresses to determine the identity of the wireless client device 102 (that the message originated from the wireless client device 102).

The AP 104 may be managed or controlled by the WLC 106, which represents a network management service for the network 108. The AP 104 is connected to the WLC 106 via the LAN/WAN to send and receive data or packets. The WLC 106 may be a control plane entity that provides or is responsible for WLAN functions such as WLAN-based access authentication services, authorization services, intrusion prevention, Radio Frequency (RF) management, and/or the like to facilitate connectivity for the wireless client device 102 via the AP 104. In one form, the WLC 106 may be a software process running on one or more servers in a cloud (on any server in a datacenter or at any location with Internet connectivity). The WLC 106 is configured with appropriate hardware (e.g., processor(s), memory element(s), and/or the like such as those depicted and described in further detail in FIG. 5), software, logic, and/or the like.

Further, the AP 104 and/or the WLC 106 may perform MAC address rotation for the wireless client device 102, at each connection, and/or for each wireless client device 102 associated with it (respective service set identifier (SSID)). MAC address rotation involves assigning one or more new MAC addresses to one or more client or endpoint devices, such as the wireless client device 102. While in one example embodiment, the MAC address rotation occurs at each connection, the techniques are not limited thereto. The MAC address rotation may occur at a preset interval, at a request of the wireless client device 102, at the direction of the WLC 106, etc. In these cases, the subsequent MAC address is then used after each RCM event, and a new MAC address is then generated using cryptographic information for the current connection.

In the network environment 100, the WLC 106 is also in communication with the AAA server 110. The AAA server 110 provides authentication services, and in some cases, maintains a mapping of authentication information established by the wireless client device 102 and a device address of the wireless client device 102. Thus, a rotation of a device address of the wireless client device 102 presents a possibility to disrupt the mapping maintained by the AAA server 110.

The WLC 106 is also in communication with the DHCP server 112. The DHCP server 112 may also maintain a mapping between the wireless client device 102 device address and an Internet Protocol (IP) address. Thus, rotation of the device address of the wireless client device 102 threatens to disrupt the mapping cached or otherwise stored by the DHCP server 112.

The WLC 106 further communicates with the ARP server 114, e.g., via the router 113. The ARP server 114 also maintains, in some cases, a mapping between a device address of the wireless client device 102 and an IP address. Additionally, one or more routers and/or wireless client devices cache ARP information (e.g., mappings from IP address to device address). Thus, when the wireless client device 102 changes its device address via address rotation, a mapping maintained by the ARP server 114 or any other devices that cache the mapping becomes obsolete, because it references a previously used device address of the wireless client device 102.

The techniques described herein provide deterministic device address rotation such that the wireless client device 102 and the AP 104 generate a subsequent or next device address that are then used to identify the wireless client device 102 on the network 108 in a subsequent connection. Since the wireless client device 102 and the AP 104 utilize equivalent methods and apply these methods to equivalent data, the AP 104 determines that, upon receiving a previously unseen device address, the device address originated from the wireless client device 102.

Briefly, at 120, the wireless client device 102 performs access authentication for establishing a secure connection with the network 108 via the AP 104 and/or the WLC 106. During access authentication, cryptographic information for encrypting one or more network messages is generated. The cryptographic information may include but is not limited to one or more encryption keys, such as a pairwise transient key (PTK) for encrypting one or more network messages, a group temporal key (GTK) for multicast traffic, etc. In one example, the PTK is then used as a seed to generate the subsequent device address. In yet another example embodiment, other wireless mechanisms that support mutual authentication may be utilized, such as dot1x or Institute of Electrical and Electronics Engineers (IEEE) 802.1X. Encryption information is obtained based on performing mutual authentication.

Specifically, at 122, the wireless client device 102 generates the subsequent device address (Addr2) based on the cryptographic information (e.g., the PTK), as shown in the first image 102-1. The wireless client device 102 stores the subsequent device address (Addr2) in a connection profile, for example, in association with the SSID of the network 108 and/or the AP 104, and uses it for the subsequent connection.

At 124, the AP 104 also generates the same subsequent device address (Addr2) for the wireless client device 102 based on the same cryptographic information. The subsequent device address (Addr2) is stored in association with the current device address (Addr1) and other information related to the wireless client device 102. It may be stored by the AP 104, the WLC 106, and/or one or more of the other entities in the network environment 100.

At 126, the wireless client device 102 attempts to connect to the AP 104 (a subsequent connection request), as shown in the second image 102-2. In this example, since the address rotation is being performed at each connection, the wireless client device 102 uses the subsequent device address (Addr2) for this next connection. The AP 104 and/or the WLC 106 searches for the subsequent device address (Addr2) in a stored plurality of subsequent device addresses. That is, the AP 104 and/or the WLC 106 compares the subsequent device address (Addr2) with a plurality of subsequent device addresses stored in association with various endpoint devices. Based on the subsequent device address (Addr2) matching the subsequent device address (Addr2) generated at 124, the AP 104 and/or the WLC 106 knows that the wireless client device 102 is requesting to establish another connection to the network 108. The AP 104 and/or WLC 106 may then generate a new device address (Addr3) for the next connection and store the new device address (Addr3) in association with the subsequent device address (Addr2) and, optionally, the previous device address (Addr1).

Further, the AP 104 and/or WLC 106 may inform other entities (such as the AAA server 110, the DHCP server 112, and/or the ARP server 114) in the network environment 100 of the subsequent device address (Addr2) for the wireless client device 102. In yet another example, the other entities in the network environment 100 may determine the subsequent device address (Addr2) using the techniques explained above.

Using the temporal or transient keys (as opposed to the master keys, for example) enhances the security of the techniques because transient or temporal keys are not exchanged or shared between entities of the network environment 100. Since these temporal keys are only internally generated, an eavesdropper cannot determine the seed for the RCM by sniffing the network traffic. Moreover, since device addresses do not use any key generated specifically for the device address rotation purposes, no new information needs to be exchanged and/or generated for predictive deterministic generation of the device addresses. The techniques rely on the previously used device address and a seed (internally generated for encryption purposes) to generate a subsequent device address.

The techniques presented herein further provide for pure random device addresses that satisfy the privacy concern against out-of-network listeners but allow the trusted network (e.g., the network 108) to know the identity of the wireless client device 102. As such, services that require device address knowledge (e.g., the AAA server 110, the DHCP server 112, the ARP server 114) can still be used. While in one example, the wireless client device 102 uses a different device address at each connection, the techniques are not limited thereto. The techniques protect the privacy of the wireless client device 102 against eavesdroppers or a network that the wireless client device 102 does not intend to connect to but allow the wireless client device 102 to share its address identity with the networks that the wireless client device 102 intends to connect to and therefore trust. Details of the techniques are discussed further below.

Figure 2:
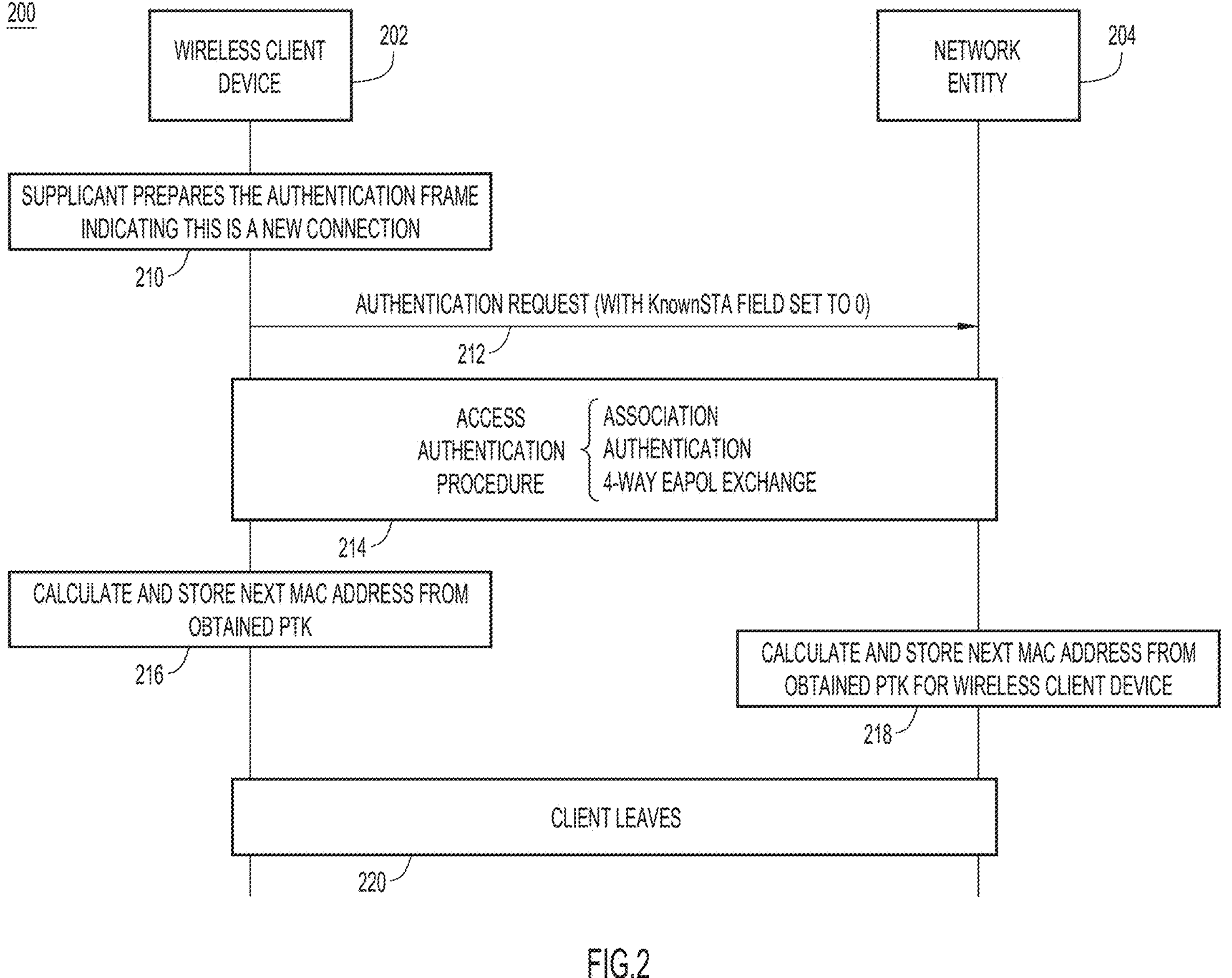
FIG. 2 is a sequence diagram illustrating a process of generating a subsequent device address during initial connection of a wireless client device with a network, according to an example embodiment.

With continued reference to FIG. 1, FIG. 2 is a sequence diagram illustrating a process 200 of generating a subsequent device address during an initial connection of a wireless client device with a network, according to an example embodiment. The process 200 involves a wireless client device 202, such as the wireless client device 102 of FIG. 1, and a network entity 204, such as the AP 104 of FIG. 1 and/or the WLC 106 of FIG. 1. The notations "a-n", "1-n", etc. denote that a number is not limited, can vary widely, and depends on a particular use case scenario and deployment.

At 210, the wireless client device 202 (sometimes referred to as "supplicant" based on the Institute of Electrical and Electronics Engineers (IEEE) standard 802.11) generates a request for establishing a secure connection to a wireless network. The request may be in the form of an authentication frame. The request includes a new field or flag that indicates whether this is a first or an initial connection of the wireless client device 202 to the wireless network or whether the wireless client device 202 was previously connected to the wireless network. If it is not the first time or initial connection, the wireless client device 202 connects to the wireless network; these connections are referred to as "subsequent" or "next" connections.

At 212, the network entity 204 obtains the connection request with the field being set to 0 (or the flag not being set). In one example embodiment, signaling the initial or first connection is performed using a flag or an information element that is set to 0 for the first connection and then set to 1 for subsequent connections.

Based on the flag not being set in the request, the wireless client device 202 and the network entity 204 perform an access authentication procedure 214 for establishing the secure connection to the wireless network. The access authentication procedure may be performed using various known techniques and known protocols.

In some example embodiments, the access authentication procedure is an Extensible Authentication Protocol (EAP) authentication procedure. Specifically, the wireless client device 202 and the network entity 204 perform an authentication, association, and a 4-way handshake message exchange. The 4-way handshake message exchange includes, for example, the wireless client device 202 sending an association request message to the network entity 204, requesting an association (attachment request). The network entity 204 then responds with an association response message. The wireless client device 202 and the network entity 204 exchange capability information. For example, each of the association request message and the association response message includes one or more information elements (IEs) indicating capability information. In some example embodiments, the capability information indicates whether the device sending the capability information supports device address generation and rotation according to the techniques set forth herein. For example, the capability information indicates whether the wireless client device 202 and/or the network entity 204 support deterministic generation of a subsequent device address using the current device address and a transient encryption key generated in the EAPOL 4-way handshake described in IEEE 802.1X. In some example embodiments, the wireless client device 202 and/or the network entity 204 condition performance of the message sequence described below based on the capability information indicated by the other device.

At the end of the access authentication procedure 214, the wireless client device 202 and the network entity 204 establish a secure association with a Pairwise Master Key Security Association (PMKSA) and a Pairwise Transient Key Security Association (PTKSA). As part of this procedure, each side generates a PTK (e.g., in a form of PTK=KDF-Hash-Length(PMK-R1, "FT-PTK", SNonce||ANonce||BSSID||STA-ADDR, where KDF is a key derivation function, PMK is a pairwise master key, and R1 indicates a second-level key in the fast basic service set transition (FT) hierarchy, SNonce and ANonce are random numbers that are used in authentication, BSSID is a basic service set identifier, and STA-ADDR is the device address) The PTK is generated according to the protocol described in IEEE 802.1X. The PTK may be 64 bytes (512 bits) in length and has the same value on both sides (the wireless client device 202 and the network entity 204). The PTK is an example of the encryption information generated by the wireless client device 202 and the network entity 204 during the access authentication procedure 214. The PTK is generated internally by each side and is not sent across the network (not exchanged).

At 216, the wireless client device 202 calculates and stores a subsequent device address (e.g., the next MAC address) from the PTK. Specifically, the next MAC address of the wireless client device 202 is obtained by hashing the current MAC address (used with the service set identifier (SSID)) and a seed obtained from the generated PTK. For example, the wireless client device 202 computes the next MAC address from the value of the PTK, e.g., a 48-bit hash. This computation is performed using various techniques such as non-cryptographic techniques (e.g., Fowler-Noll-Vo (FNV) or others), or cryptographic functions (e.g., Blake2X, secure hashing algorithm (SHA), or others).

The next MAC address may have a fixed length. For example, when the generated hash exceeds 48 bits, the first 48 bits are retained (HASH=Truncate-48(Hash(PTK))). The locally administered bit is then set (if the hash value did not set it). The next MAC address may be added to a connection profile and stored in association with the current MAC address and the SSID of the wireless network.

At 218, the network entity 204 calculates and stores the next MAC address for the wireless client device 202 from the obtained PTK. The network entity 204 generates the next MAC address for the wireless client device 202 using the same technique described above at 216. Since the PTK is known at the wireless client device 202 and the network entity 204 (but is not sent across), each side computes the same next MAC address, e.g., the 48-bit hash. The next MAC address is stored in association with the current MAC address and other information about the wireless client device 202.

The wireless client device 202 and the network entity 204 determine the next MAC address without exchanging any additional information for these computations. The techniques set forth herein support Wi-Fi Protected Access (WPA), such as WPA, WPA2, or WPA3 security. Networks that do not provide WPA security, may provide a suboptimal protected environment that could not satisfy the privacy concerns discussed above.

In one example embodiment, the network entity 204 may further perform a conflict resolution procedure in which the network entity 204 verifies that the newly generated device address (the next MAC address) is not in use or has been used by any wireless client devices connected to the wireless network and/or with a valid session (such as the PMK cache, sleeping client, anticipated MAC addresses of returning clients, etc.). Each time a collision occurs, the network entity 204 signals, over a protected connection, to the wireless client device 202 that the generated hash is invalid to trigger the wireless client device 202 and the network entity 204 to hash the values one more time (the current device address and the PTK). This process is repeated until a unique MAC address is generated. It is understood that this procedure may limit collisions to some degree and that duplicates may still appear between the time of this verification and the future return of the wireless client device 202. In one example, the conflict resolution procedure may be particularly applicable to limit the risk of collision with wireless client devices that have long-lasting sessions with the network. For other wireless client devices (the ones using a temporal MAC and a temporal session), the collision space may be bounded by the "birthday paradox" (with a 50% collision chance appearing above $10^{27}$ MAC addresses).

The wireless client device 202 stores the next MAC address as the subsequent device address to be used in a subsequent connection for this wireless network. For example, the wireless client device 202 saves the hash in a current connection profile (e.g., in association with BSSID, SSID, Mobility Domain Element if applicable). The network entity 204 also stores the final successful hash, as the next MAC address for the wireless client device 202. The network entity 204 does not need to store more than the final successful hash in association with the wireless client device 202.

At 220, the wireless client device 202 leaves the network e.g., terminates the secure connection with the network entity 204. The network entity 204 and the wireless client device 202 maintain, for a predetermined time interval, the subsequent device address for a subsequent connection to the network.

Figure 3:
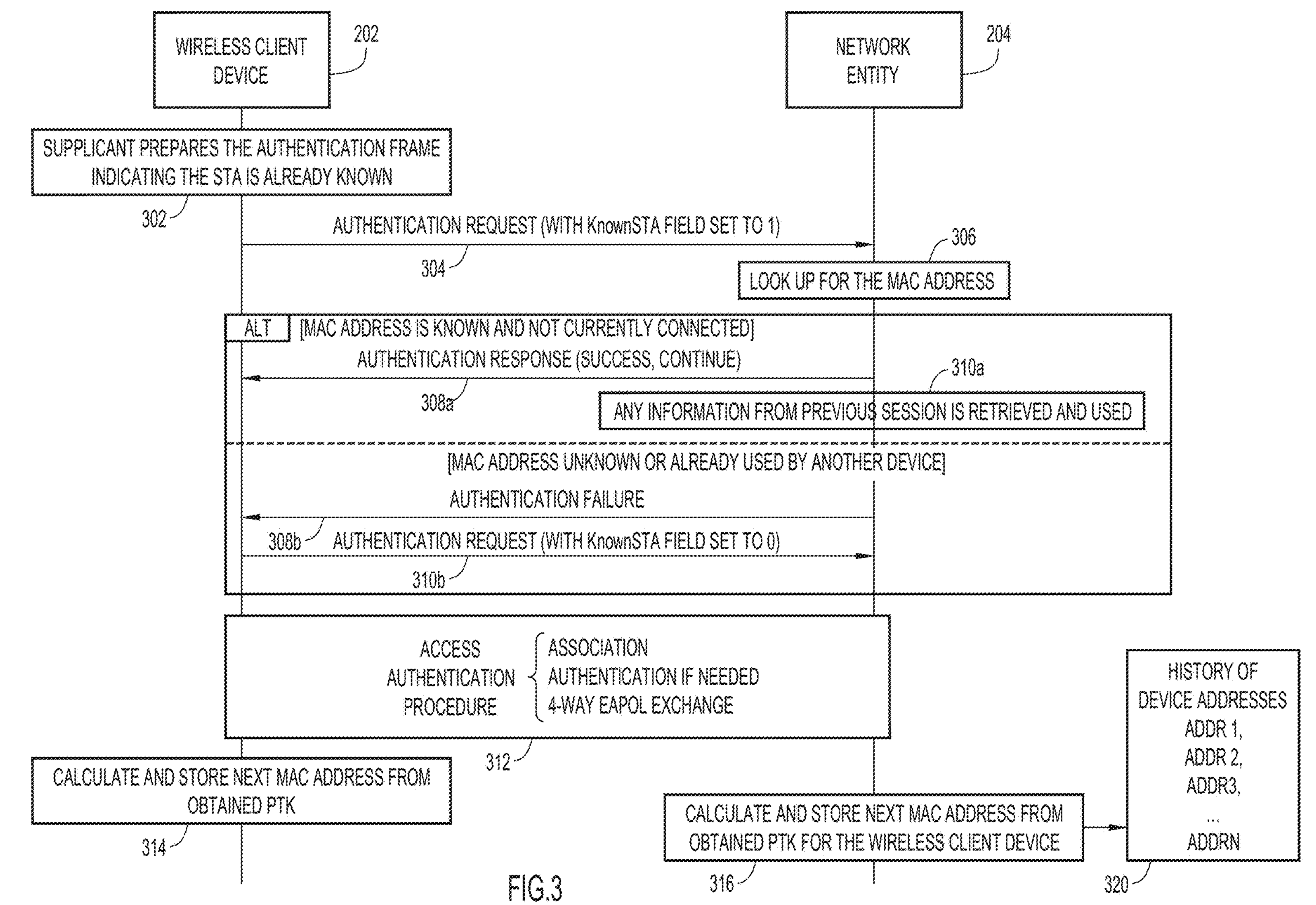
FIG. 3 is a sequence diagram illustrating a process of using the subsequent device address of a wireless client device for establishing a subsequent connection to the network, according to an example embodiment.

With continued reference to FIGS. 1 and 2, FIG. 3 is a sequence diagram illustrating a process 300 of using the subsequent device address of a wireless client device for establishing a subsequent connection to the network, according to an example embodiment. The process 300 involves the wireless client device 202 of FIG. 2 and the network entity 204 of FIG. 2.

When the wireless client device 202 connects to the same network (e.g., the same SSID), to the same network entity 204 (e.g., the same AP or the AP in the same mobility domain), the wireless client device 202 may then use the generated next MAC address (e.g., the saved hash).

Specifically, at 302, the wireless client device 202 generates an authentication frame in which an informational element (IE) indicates that the wireless client device 202 is known to the network entity 204. For example, the IE may be a set flag or a field to signal that this is a subsequent connection (not the initial connection). At 304, the wireless client device 202 sends the generated authentication request that includes the subsequent device address and the field being set to 1.

An observer may view the 48-bit value, which is a truncated hash that was once formed from an unknown previous MAC address of the wireless client device 202, unknown SNonce, unknown ANonce, unknown PMK, possibly known BSSID (if the wireless client device 202 connects to the same network entity 204 multiple times). Therefore, the observer seeing the new MAC address cannot determine or obtain useful information about the wireless client device 202 and the previous PMKSA.

At 306, the network entity 204 performs a lookup operation for a connection profile of the wireless client device 202 using the MAC address (subsequent device address) provided in the authentication request. That is, the network entity 204 compares the subsequent device address with a plurality of stored subsequent device addresses to find a match.

If the lookup operation indicates that the MAC address is known and not currently connected to the network, at 308*a*, the network entity 204 provides an authentication response to the wireless client device 202. The authentication response indicates that the wireless client device 202 is found and authenticated (success). At 310*a*, the network entity 204 retrieves the connection profile associated with the wireless client device 202 (information from the previous session/connection) and uses this information to establish the subsequent secure connection. The network entity 204 recovers information or available sessions of the wireless client device 202 and determines accordingly the authentication to be performed.

Various authentications may be performed based on a particular use case scenario. In some example embodiments, the network entity 204 may require a full authentication procedure and just store in a memory that the wireless client device 202 is a returning device to identify the device address. In other example embodiments, the network entity 204 may partially skip some steps of the authentication procedure and reassign to the wireless client device 202 at least a part of its previous connection profile.

If the lookup operation indicates that the MAC address is unknown (no match is found) and/or is being used by another endpoint device, at 308*b*, the network entity 204 provides an authentication failure response (a failure notification). That is, an endpoint device having a pre-calculated MAC address cannot know if this is still present on the authenticator side, i.e., stored at the network entity 204. For example, depending on different timeouts, the network entity 204 may flush caches and delete the subsequent device addresses stored therein. In this case, the authentication request from the wireless client device 202 indicating that it is a known station will be rejected (authentication failure notification). The wireless client device 202 that receives an authentication failure notification resets the flag to 0 and sends another authentication request in which the reset flag indicates that it is a new endpoint device (an initial connection). At 310*b*, the wireless client device 202 sends the new authentication request in which the field is reset to 0.

At 312, the wireless client device 202 and the network entity 204 perform an access authentication procedure, such as the access authentication procedure 214 of FIG. 2. At 314, the wireless client device 202 calculates and stores the next MAC address from the obtained PTK (generated at 312) and at 316, the network entity 204 calculates and stores the next MAC address for the wireless client device 202 from the obtained PTK (generated at 312). If a conflict is detected, the network entity 204 notifies the wireless client device 202 that the next MAC address is invalid to trigger another calculation of the next MAC address.

As noted above, if the network entity 204, serving as the authenticator, receives an authentication or association request stating that this is a first/initial connection but the MAC address is known (expected or in use), the authentication or association request should be denied (authentication failure notification at 308*b*).

In one example embodiment, the network entity 204 further maintains a table 320 that includes device addresses that were used (Addr1 and Addr2), are currently used (Addr3), and/or will be used (Addrn) by the same endpoint device (the wireless client device 202). History of device addresses as well as troubleshooting information for the endpoint device may thus be retrieved although the device address changed over time. Further, the subsequent device address information may be propagated to other network entities that use device address information as a unique device identifier such as the AAA server 110 of FIG. 1.

RCM and the lack of stable identifiers create challenges for networks and technologies that rely on the device address to identify the endpoint device/client. The technique presented herein use rotating or randomizing identities of endpoint devices that do not influence the identity of the client and that allow the client to still be recognized by the trusted network(s), network infrastructure(s), and/or technologies. The techniques presented herein satisfy privacy concerns by rotating the device address e.g., at each connection but avoid breakage of features that rely on the device address as the client identity. A subsequent device address is deterministically generated based on the current device address and one or more elements of the current association (such as the PTK). By using the PTK as a seed for generating the subsequent device address, no additional information for the RCM needs to be generated and/or exchanged. The subsequent device address for the RCM is generated within the association flow as defined, for example, by the EAP (at the same time and from the same information). The one or more elements that are used as a seed to generate the subsequent device address are known on both sides (the client network device and the network entity) but these elements are not exchanged or shared. Instead, the seed is internally generated, such as the PTK derived from a Pairwise Master Key Security Association (PMKSA) and Pairwise Transient Key Security Association (PTKSA). The seed and the current device address are hashed by both sides to thereby generate the next device address.

Figure 4:
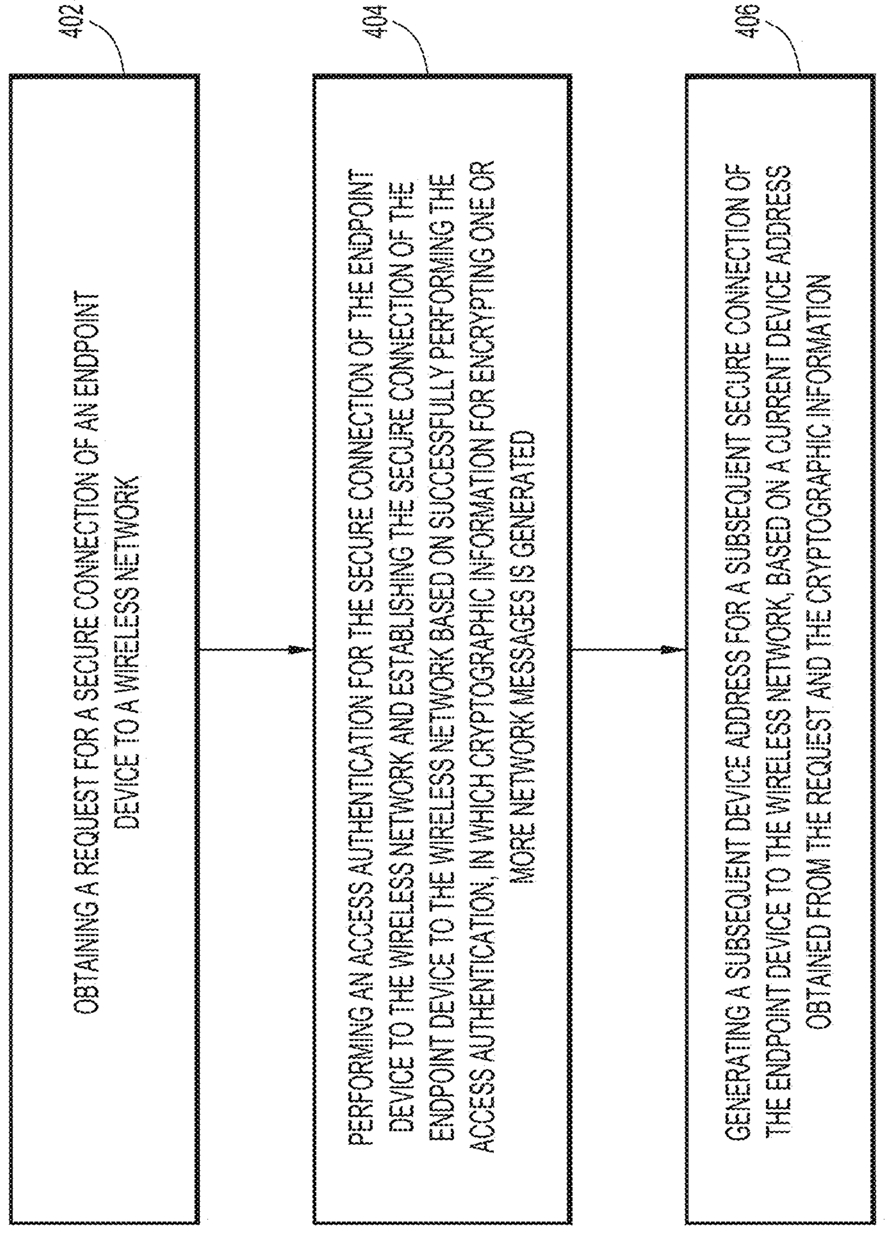
FIG. 4 is a flow diagram illustrating a method of establishing a secure connection of an endpoint device to a wireless network based on a successful authentication in which a subsequent device address is generated, according to an example embodiment.

FIG. 4 is a flowchart illustrating a method 400 of establishing a secure connection of a client device to a wireless network based on a successful authentication in which a subsequent device address is generated, according to an example embodiment. The method 400 may be performed by a network entity, such as the AP 104 or the WLC 106 of FIG. 1 or the network entity 204 of FIGS. 2 and 3.

The method 400 involves at 402, obtaining a request for a secure connection of an endpoint device to a wireless network.

The method 400 further involves, at 404, performing an access authentication for the secure connection of the endpoint device to the wireless network and establishing the secure connection of the endpoint device to the wireless network based on successfully performing the access authentication, in which cryptographic information for encrypting one or more network messages is generated.

The method 400 further involves, at 406, generating a subsequent device address for a subsequent secure connection of the endpoint device to the wireless network, based on a current device address obtained from the request and the cryptographic information.

In one or more example embodiments, the method 400 may further involve storing the current device address and the subsequent device address in association with the endpoint device. The method 400 may yet further involve establishing the subsequent secure connection of the endpoint device to the wireless network and obtaining the one or more network messages. The method 400 may further involve determining whether the one or more network messages originated from the endpoint device by comparing a source address in the one or more network messages with the subsequent device address.

In one instance, the method 400 may further involve generating a pairwise transient key (PTK) for encrypting the one or more network messages, based on the cryptographic information, wherein the subsequent device address is generated based on the PTK.

In one form, the method 400 may further involve computing a hash value based on the PTK and the current device address. The hash value may be the subsequent device address.

In one or more example embodiments, the method 400 may further involve determining whether the hash value is one of a plurality of device addresses for other endpoint devices. The method 400 may further involve, based on determining that the hash value is one of the plurality of device addresses, notifying the endpoint device that the hash value is invalid to trigger the endpoint device to generate another hash value for the subsequent device address and computing a new hash value for the subsequent device address of the endpoint device.

In one instance, the operation 404 of performing the access authentication may include exchanging one or more Extensible Authentication Protocol (EAP) messages in which the cryptographic information is generated for the secure connection of the endpoint device to the wireless network.

In another instance, the request for the secure connection may include the current device address and a flag. The method 400 may further involve, based on the flag being set, determining that the endpoint device had at least one previous secure connection to the wireless network, and based on the flag not being set, determining that the endpoint device is new to the wireless network.

In one form, the method 400 may further involve, based on determining that the endpoint device had the at least one previous secure connection to the wireless network, obtaining the current device address from the request for the secure connection and comparing the current device address to a plurality of subsequent device addresses stored in association with a plurality of endpoint devices. The method 400 may further involve establishing the secure connection of the endpoint device to the wireless network based on determining that the current device address matches one of the plurality of subsequent device addresses.

In one or more example embodiments, the method 400 may further involve based on the flag being set and the current device address not matching one of the plurality of subsequent device addresses, providing, to the endpoint device, an authentication failure notification such that the endpoint device resets the flag for a subsequent connection request.

In another form, the method 400 may further involve storing the current device address and the subsequent device address in a connection profile for the endpoint device such that the subsequent device address for the subsequent secure connection of the endpoint device to the wireless network is known.

Figure 5:
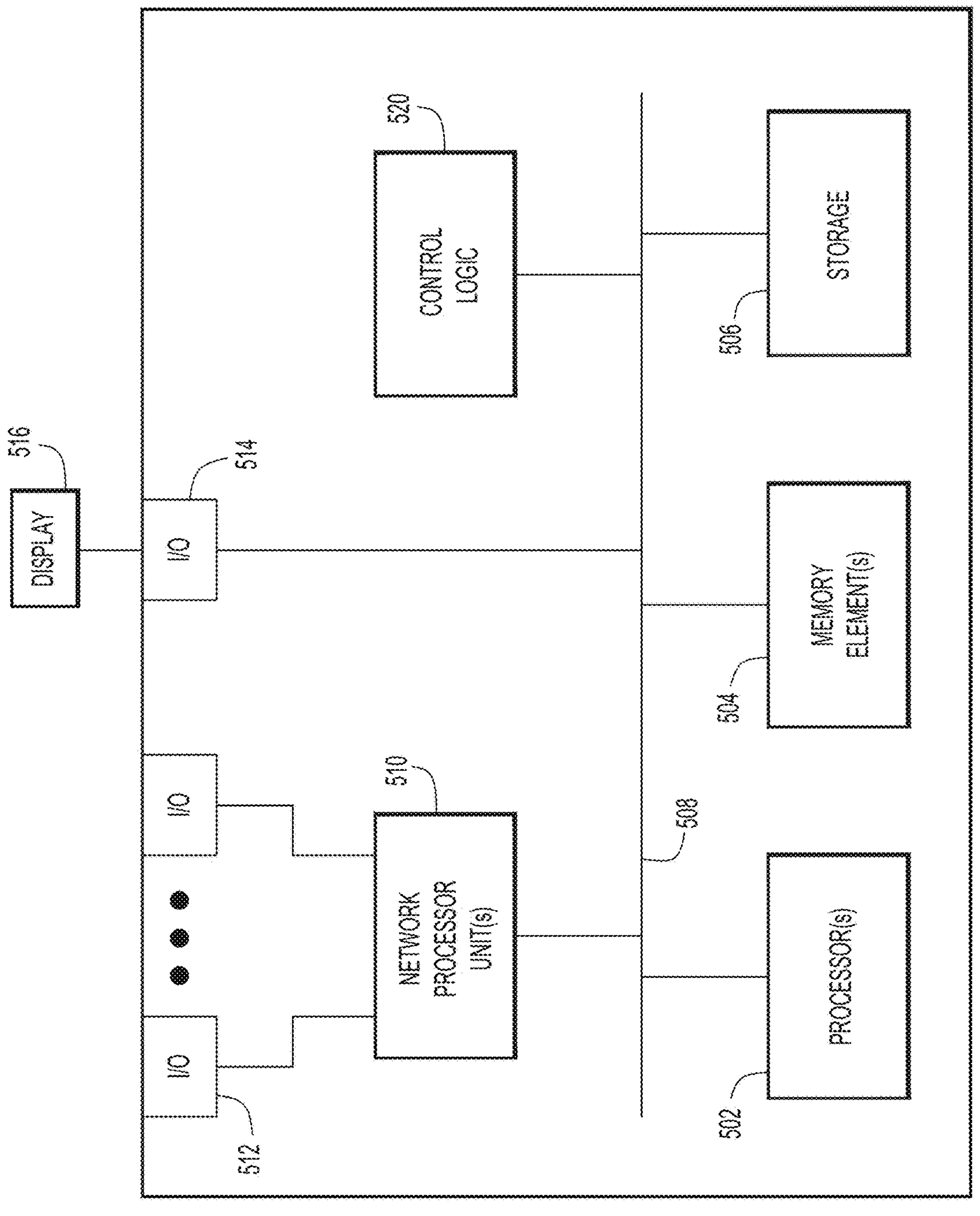
FIG. 5 is a hardware block diagram of a computing device that may perform functions associated with any combination of operations in connection with the techniques depicted and described in FIGS. 1-4, according to various example embodiments.

FIG. 5 is a hardware block diagram of a computing device 500 that may perform functions associated with any combination of operations in connection with the techniques depicted in FIGS. 1-4, according to various example embodiments, including, but not limited to, operations of the one or more wireless client devices such as the wireless client device 102 of FIG. 1 or the wireless client device 202 of FIGS. 2 and 3. Further, the computing device 500 may be representative of the AP 104, the WLC 106, the AAA server 110, the DHCP server 112, the router 113, or the ARP server 114 of FIG. 1. The computing device 500 may be representative of the network entity 204 of FIGS. 2 and 3. It should be appreciated that FIG. 5 provides only an illustration of one example embodiment and does not imply any limitations with regard to the environments in which different example embodiments may be implemented. Many modifications to the depicted environment may be made.

In at least one embodiment, computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of the potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with one or more memory elements 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, and/or any other I/O port(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computing device 500. For example, I/O interface(s) 514 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor 516, a display screen (touch screen on a mobile device), or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof, and/or the like to facilitate various operations for embodiments described herein.

In another example embodiment, an apparatus is provided. The apparatus includes a network interface to receive and send packets in a network and a processor. The processor is configured to perform various operations including obtaining, from the network interface, a request for a secure connection of an endpoint device to a wireless network and performing an access authentication for the secure connection of the endpoint device to the wireless network in which cryptographic information for encrypting one or more network messages is generated. The operations further include establishing the secure connection of the endpoint device to the wireless network based on successfully performing the access authentication and generating a subsequent device address for a subsequent secure connection of the endpoint device to the wireless network, based on a current device address obtained from the request and the cryptographic information.

In yet another example embodiment, one or more non-transitory computer readable storage media encoded with instructions are provided. When the media is executed by a processor, the instructions cause the processor to execute a method that involves obtaining a request for a secure connection of an endpoint device to a wireless network and performing an access authentication for the secure connection of the endpoint device to the wireless network in which cryptographic information for encrypting one or more network messages is generated. The method further involves establishing the secure connection of the endpoint device to the wireless network based on successfully performing the access authentication and generating a subsequent device address for a subsequent secure connection of the endpoint device to the wireless network, based on a current device address obtained from the request and the cryptographic information.

In yet another example embodiment, a system is provided that includes the devices and operations explained above with reference to FIGS. 1-5.

The programs described herein (e.g., control logic 520) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 506 and/or memory element(s) 504 can store data, software, code, instructions (e.g., processor instructions), logic, parameters, combinations thereof, and/or the like used for operations described herein. This includes the storage 506 and/or memory elements(s) 504 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., TI lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained by one skilled in the art and it is intended that the present disclosure encompass all such changes, substitutions, variations, alterations, and/or modifications as falling within the scope of the appended claims.

What is claimed is:

1. A method comprising:

obtaining, by a computing device, a request for a secure connection of an endpoint device to a wireless network;

performing an access authentication for the secure connection of the endpoint device to the wireless network and establishing the secure connection of the endpoint device to the wireless network based on successfully performing the access authentication, in which cryptographic information for encrypting one or more network messages is generated;

generating a temporal key for encrypting the one or more network messages based on the cryptographic information;

generating, by the computing device, a subsequent device address for a subsequent secure connection of the endpoint device to the wireless network, based on a current device address obtained from the request and the temporal key;

storing the subsequent device address in association with the current device address of the endpoint device; and upon determining that the current device address does not match one of a plurality of subsequent device addresses stored in association with the endpoint device providing the request, providing an authentication failure notification to the endpoint device.

2. The method of claim 1, further comprising:

establishing, by the computing device, the subsequent secure connection of the endpoint device to the wireless network;

obtaining, by the computing device, the one or more network messages; and determining, by the computing device, whether the one or more network messages originated from the endpoint device by comparing a source address in the one or more network messages with the subsequent device address.

3. The method of claim 1, wherein generating the temporal key includes:

generating, by the computing device, a pairwise transient key (PTK) for encrypting the one or more network messages, based on the cryptographic information, wherein the subsequent device address is generated based on the PTK.

4. The method of claim 3, further comprising:

computing a hash value based on the PTK and the current device address, wherein the hash value is the subsequent device address.

5. The method of claim 4, further comprising:

determining whether the hash value is one of a plurality of device addresses for other endpoint devices; and based on determining that the hash value is one of the plurality of device addresses:

notifying the endpoint device that the hash value is invalid to trigger the endpoint device to generate another hash value for the subsequent device address, and computing, by the computing device, a new hash value for the subsequent device address of the endpoint device.

6. The method of claim 1, wherein performing the access authentication includes:

exchanging one or more Extensible Authentication Protocol (EAP) messages in which the cryptographic information is generated for the secure connection of the endpoint device to the wireless network.

7. The method of claim 1, wherein the request for the secure connection includes the current device address and a flag, and further comprising:

based on the flag being set, determining that the endpoint device had at least one previous secure connection to the wireless network, and based on the flag not being set, determining that the endpoint device is new to the wireless network.

8. The method of claim 7, further comprising:

based on determining that the endpoint device had the at least one previous secure connection to the wireless network, obtaining the current device address from the request for the secure connection and comparing the current device address to a plurality of subsequent device addresses stored in association with a plurality of endpoint devices; and establishing, by the computing device, the secure connection of the endpoint device to the wireless network based on determining that the current device address matches one of the plurality of subsequent device addresses.

9. The method of claim 8, further comprising:

based on the flag being set and the current device address not matching one of the plurality of subsequent device addresses, providing, to the endpoint device, an authentication failure notification such that the endpoint device resets the flag for a subsequent connection request.

10. The method of claim 1, wherein the current device address and the subsequent device address are stored in a connection profile for the endpoint device such that the subsequent device address for the subsequent secure connection of the endpoint device to the wireless network is known.

11. The method of claim 1, wherein the request for the secure connection includes the current device address and a flag, the method further comprising:

based on the flag being set, determining that the endpoint device had at least one previous secure connection to the wireless network, and based on the flag being set and the current device address not matching one of a plurality of subsequent device addresses, providing, to the endpoint device, an authentication failure notification such that the endpoint device resets the flag for a subsequent connection request.

12. The method of claim 1, further comprising:

establishing the subsequent secure connection using the subsequent device address;

generating a new device address for the endpoint device for a next connection; and adding the new device address to a connection profile for the endpoint device, wherein the new device address is stored in association with the subsequent device address.

13. The method of claim 1, further comprising:

upon determining that the current device address does not match one of the plurality of subsequent device addresses stored in association with the endpoint device providing the request, generating, by the computing device, a new subsequent device address for the subsequent secure connection of the endpoint device to the wireless network.

14. An apparatus comprising:

a network interface to receive and send packets in a network; and a processor, wherein the processor is configured to perform operations comprising:

obtaining a request for a secure connection of an endpoint device to a wireless network;

performing an access authentication for the secure connection of the endpoint device to the wireless network and establishing the secure connection of the endpoint device to the wireless network based on successfully performing the access authentication, in which cryptographic information for encrypting one or more network messages is generated;

generating a temporal key for encrypting the one or more network messages based on the cryptographic information; and generating a subsequent device address for a subsequent secure connection of the endpoint device to the wireless network, based on a current device address obtained from the request and the temporal key;

storing the subsequent device address in association with the current device address of the endpoint device; and upon determining that the current device address does not match one of a plurality of subsequent device addresses stored in association with the endpoint device providing the request, providing an authentication failure notification to the endpoint device.

15. The apparatus of claim 14, wherein the processor is further configured to perform:

establishing the subsequent secure connection of the endpoint device to the wireless network;

obtaining the one or more network messages; and determining whether the one or more network messages originated from the endpoint device by comparing a source address in the one or more network messages with the subsequent device address.

16. The apparatus of claim 14, wherein the processor is configured to generate the temporal key by:

generating a pairwise transient key (PTK) for encrypting the one or more network messages, based on the cryptographic information, wherein the subsequent device address is generated based on the PTK.

17. The apparatus of claim 16, wherein the processor is further configured to perform:

computing a hash value based on the PTK and the current device address, wherein the hash value is the subsequent device address.

18. The apparatus of claim 17, wherein the processor is further configured to perform:

determining whether the hash value is one of a plurality of device addresses for other endpoint devices; and based on determining that the hash value is one of the plurality of device addresses:

notifying the endpoint device that the hash value is invalid to trigger the endpoint device to generate another hash value for the subsequent device address, and computing a new hash value for the subsequent device address of the endpoint device.

19. The apparatus of claim 14, wherein the processor is configured to perform the access authentication by:

exchanging one or more Extensible Authentication Protocol (EAP) messages in which the cryptographic information is generated for the secure connection of the endpoint device to the wireless network.

20. One or more non-transitory computer readable storage media encoded with software comprising computer executable instructions that, when executed by a processor, cause the processor to perform a method including:

obtaining a request for a secure connection of an endpoint device to a wireless network;

performing an access authentication for the secure connection of the endpoint device to the wireless network and establishing the secure connection of the endpoint device to the wireless network based on successfully performing the access authentication, in which cryptographic information for encrypting one or more network messages is generated;

generating a temporal key for encrypting the one or more network messages based on the cryptographic information;

generating a subsequent device address for a subsequent secure connection of the endpoint device to the wireless network, based on a current device address obtained from the request and the temporal key;

storing the subsequent device address in association with the current device address of the endpoint device; and upon determining that the current device address does not match one of a plurality of subsequent device addresses stored in association with the endpoint device providing the request, providing an authentication failure notification to the endpoint device.

21. The one or more non-transitory computer readable storage media according to claim 20, wherein the computer executable instructions cause the processor to further perform:

establishing the subsequent secure connection of the endpoint device to the wireless network;

obtaining the one or more network messages; and determining whether the one or more network messages originated from the endpoint device by comparing a source address in the one or more network messages with the subsequent device address.

* * * * *